UNITED STATES PATENT OFFICE.

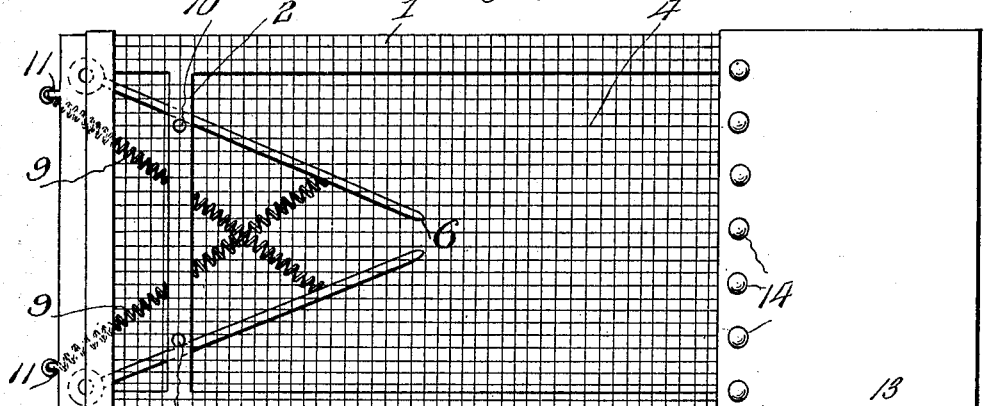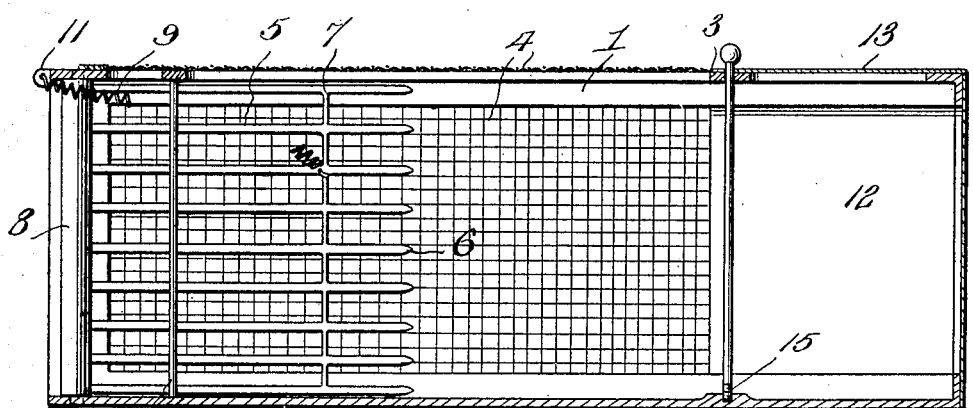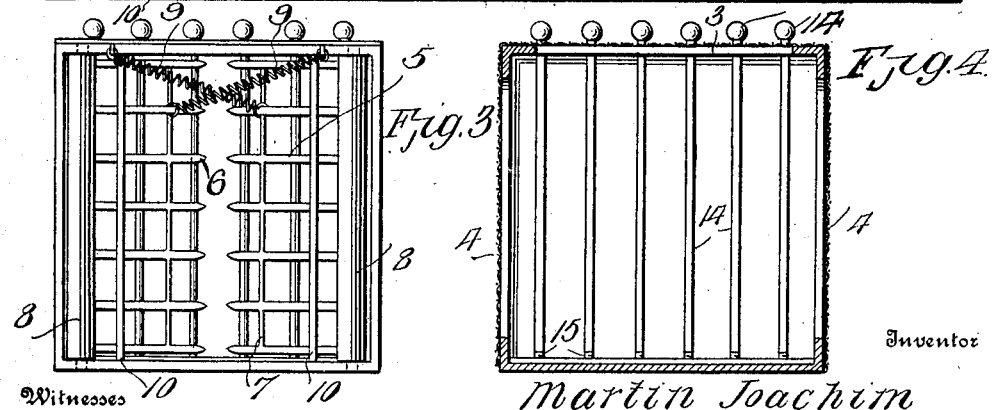

MARTIN JOACHIM, OF MAZEPPA, MINNESOTA.

ANIMAL-TRAP.

No. 885,481.  Specification of Letters Patent.  Patented April 21, 1908.

Application filed November 22, 1907. Serial No. 403,333.

*To all whom it may concern:*

Be it known that I, MARTIN JOACHIM, a citizen of the United States of America, residing at Mazeppa, in the county of Wabasha and State of Minnesota, have invented new and useful Improvements in Animal-Traps, of which the following is a specification.

This invention relates to animal traps, and one of the principal objects of the same is to provide a trap with a live bait chamber partitioned off from the trap by slats or pins so that the bait can be always seen.

Another object is to provide a trap with converging members actuated by springs to permit animals to enter the trap and to prevent their escape.

These and other objects may be attained by means of the construction illustrated in the accompanying drawing, in which:—

Figure 1 is a top plan view of a trap made in accordance with my invention. Fig. 2 is a longitudinal section of the same. Fig. 3 is a front elevation. Fig. 4 is a transverse vertical section.

Referring to the drawing for a more specific description of my invention, the numeral 1 designates the corner strips of the frame of the trap, said corner strips being connected by a cross bar 2 at the top near the front and a cross bar 3 near the other end thereof. The sides and top of the trap are covered with wire netting 4. The two door members 5 comprise a series of bars having pointed front ends 6, said bars being connected by a cross bar 7 and said bars being mounted in rollers 8, said rollers being journaled at the top and bottom in the frame of the trap. Springs 9 normally hold the members 5 in the position shown in Fig. 1, stops 10 being provided to hold said members in the position shown against the tension of the springs 9 which are connected at one of their ends to the members 5 and their opposite ends being connected to a lug 11 on the end of the trap.

At the opposite end of the trap a live bait compartment 12 is provided, said compartment being inclosed by a metal cover 13. A series of pins 14 extends through the cover 13 through the cross bar 3, and their threaded ends 15 are fitted in sockets in the bottom of the trap.

The operation of my invention may be briefly described as follows: Live bait, such as a chicken, a rabbit, or other animal or bird, is placed within the compartment 12. An animal attracted by the live bait will force the members 5 apart against the tension of the springs 9 to get at the live bait. After passing the members 5 the animal can not retrace his steps and escape between the members 5.

Having thus described the invention, what is claimed as new, is:—

A trap comprising a casing, a series of rods extending vertically through the upper portion of the casing and engaging the lower portion or floor thereof to form a live bait compartment, converging members, each consisting of a series of bars having pointed ends and connected cross bars, spiral springs connected at one end to the casing and having their opposite ends connected to said converging members, and stops for said converging members.

In testimony whereof I affix my signature in presence of two witnesses.

MARTIN JOACHIM.

Witnesses:
  NICK JOACHIM,
  E. L. SYLVESTER.